United States Patent Office 2,826,501

Patented Mar. 11, 1958

2,826,501

LITHOGRAPHIC COATING SOLUTION AND LITHOGRAPHIC PLATES COATED THEREWITH

George R. Hodgins, Seaford, N. Y., assignor to Litho Chemical and Supply Co. Inc., Lynbrook, N. Y., a corporation of New York No Drawing. Application December 20, 1956
Serial No. 629,439

7 Claims. (Cl. 96—91)

The present invention relates to an improved light-sensitive lithographic coating solution and to lithographic plates prepared through the use of such solution.

Light-sensitive coated lithographic plates prepared by means of a coating solution containing the condensation product of p-diazo diphenylamine and formaldehyde are known. Such condensation product is, for example, available as Diazo Lith #1 (Ringwood Chemical Corp.) or Diazo Resin #4 (Fairmount Chemical Corp.) and has been used as the light-sensitive, resinous printing surface on pre-sensitized lithographic plates, as described in U. S. Patents 2,100,063 and 2,613,149. The application of a diazo compound to a superpolyamide nylon surface has been discussed in U. S. Patent 2,365,416. It is further recognized that the said condensation product has certain disadvantages and shortcomings which may be summarized as follows: (1) The coating does not have a photographic speed comparable to that of pre-sensitized lithographic plates; (2) the abrasion and chemical resistance is considerably less than that desired or deemed possible; and (3) the coating solution does not enable the individual lithographer to prepare satisfactorily his own pre-sensitized lithographic plates. The application of a diazo compound to a nylon surface does not produce the desired abrasion and chemical resistance.

Objects of the present invention are to provide a light-sensitive lithographic coating having a photographic speed comparable to that of pre-sensitized lithographic plates, to make it possible to produce coated lithographic plates having a printing surface superior to currently available pre-sensitized coatings with respect to abrasion and chemical resistance, to provide the individual lithographer with a coating solution from which he can prepare his own presensitized lithographic plates, and generally to overcome the above-noted and other disadvantages of existing practices and to effect significant improvements in the lithographic art with especial reference to increased efficiency of use of equipment and greater accuracy and duration of operation. Still other objects and advantages will be understood by those skilled in this art or pointed out hereinafter.

The present invention is predicated upon the discovery that a greatly superior, stable lithographic printing plate may be prepared through the use of a special aqueous alcoholic coating solution containing the water-soluble condensation product of p-diazo diphenylamine and formaldehyde combined with a soluble super polyamide nylon resin, the constituents of the solution being present in certain critical proportions which must be adhered to within close limits in order to ensure the benefits of the invention.

In general, a diazo resin solution and a nylon resin solution are separately prepared and then combined to produce the coating solution which is then applied to lithographic plates in known manner. The invention is further described in the following example:

*Example*

The diazo resin solution has the composition by volume:

| | Percent |
|---|---|
| Diazo resin #4 (Fairmount) | 0.400 |
| Solox (anhydrous) | 69.065 |
| Nonic 218 (100%) | 0.035 |
| Water | 30.500 |

These constituents are thoroughly mixed until the diazo resin is completely dissolved and the mixture is then filtered through #802 filter paper.

The soluble superpolyamide nylon resin solution has the composition, by volume:

| | Percent |
|---|---|
| Nylon resin (Zytel #61) (du Pont) | 1.39 |
| Solox (anhydrous) | 79.45 |
| Furfuryl alcohol | 7.63 |
| Water | 11.53 |

These constituents are heated to 140° F. in a 2-liter flask fitted with a mercury seal stirrer and reflux condenser until the nylon resin has completely dissolved following which the solution is allowed to cool to 75° F. and then filtered through #802 filter paper.

The filtered solutions are then admixed and combined to give the following formulation for the coating solution:

| | Percent |
|---|---|
| Diazo resin #4 | 0.11 |
| Nylon resin (Zytel #61) | 0.94 |
| Nonic 218 (100%) | 0.010 |
| Water | 17.15 |
| Solox (anhydrous) | 76.35 |
| Furfuryl alcohol | 5.44 |

The above coating solution formulation has been found to be critical as to its composition since very little variation can be tolerated especially in the water content which must not exceed 20%, as an amount of water greater than 20% will cause the nylon resin to precipitate. The water is therefore restricted to the range of 17 to 20%. The furfuryl alcohol can be varied somewhat from 1 to 8% of the total formulation. Too little furfuryl alcohol will detract from the ink-receptive quality of the coating or film and too much furfuryl alcohol produces a soft, slow drying coating or film. Approximately 5% of furfuryl alcohol has been found to be best and is, therefore, preferred, this constituent serving to render the image areas of the coated lithographic plate extremely ink-receptive and to improve the hardness of the exposed portions of the coating or film, presumably by reacting with the diazo polymer as a cross-linking agent.

A coating solution responding to the foregoing formulation is centrifugally applied in known manner to an aluminum sheet or plate 0.022″ thick, and known as "Alcoa Litho Sheet #1," having a passivated surface to prevent premature decomposition of the diazo resin and the coating thus produced is dried and exposed through a negative to a 35-ampere carbon arc for two minutes at a distance of 36″. The exposed plate is then developed with a developer having the composition:

| | | |
|---|---|---|
| Citric acid | grams | 1.2 |
| N-N-dimethylformamide | milliliters | 124.5 |
| Furfuryl alcohol | do | 55.2 |
| Methanol | do | 375.0 |

and, after development, the surface of the plate is dampened with a 3% gum arabic solution and a standard developing ink applied to render the image visible. A suitable lacquer emulsion, of the type referred to in U.

S. Patent 2,754,279, is used to render the image visible by coloring the image areas. The thus-prepared lithographic plate is then attached to the cylinder of a lithographic offset press and is ready for use without any further processing.

If desired, the aluminum plate may be coated with the diazo/nylon coating solution described above, protected from light and stored until required for use. In this way, a lithographer is able to prepare his own pre-sensitized plates at the time such are needed, thus providing the advantage of preventing congestion of equipment during periods of increased activity.

A diazo-nylon coating according to the invention has excellent photographic speed at least as good as that of pre-sensitized lithographic plates, a printing surface definitely superior to currently available pre-sensitized coatings, and markedly enhanced resistance to abrasion and chemical attack, so that the coating has all the requirements of a long-run surface plate coating. The coating is different from and vastly better than that produced by applying a diazo resin on a previously prepared nylon surface. This latter results from the fact that there is a uniform distribution of the diazo resin throughout the polyamide film.

Nonic 218 is a non-ionic surface active agent produced by Sharples Chemical Company. Chemically, it is polyethylene glycol tert.-dodecylthioether. Other non-ionic surface active agents can be used in place thereof such as Tween 20 of Atlas Powder Co. (polyoxyethylene sorbitan monolurate); Tween 40 of the same producer (polyoxyethylene sorbitan mono-palmitate) and Triton X–100 of Rohm & Haas (alkyl aryl polyether alcohol). Solox is a denatured ethyl alcohol made by U. S. I. and is a general purpose solvent composed of 100 parts of ethyl alcohol, 5 parts of ethyl acetate and 1 part of aviation gasoline. Solox anhydrous, known as "Anhydrous 200°" is made from 200 proof denatured ethyl alcohol. Any denatured alcohol having the same composition may be used, such as Accosolve (American Color and Chemical Corp.) or Shellacol (Shell Chemical Co.). The Fairmount Diazo Resin #4 or Ringwood Diazo Lith #1 is water-soluble, of low degree of polymerization and of narrow range molecular weight. It may be made according to U. S. Patent 2,063,631 and is referred to in U. S. Patent 2,714,066. The nylon resin (Zytel #61 of du Pont) is a co-polymer of poly caprolactam (Nylon 6), hexamethylene-diamine-adipic acid (Nylon 6/6) and hexamethylene-diamine-sebacic acid (Nylon 6/10).

The invention is defined by the appended claims.

I claim:

1. A coating material for lithographic plates consisting essentially of the following constituents in substantially the following proportions, by volume:

0.11% of the water-soluble condensation product of p-diazo diphenylamine and formaldehyde,
0.94% of soluble superpolyamide nylon resin,
0.01% of a non-ionic surface active agent (100%),
17 to 20% of water,
76.35% of denatured ethyl alcohol,
1 to 8% of furfuryl alcohol.

2. A coating material for lithographic plates consisting essentially of the following constituents in substantially the following proportions, by volume:

0.11% of the water-soluble condensation product of p-diazo diphenylamine and formaldehyde,
0.94% of soluble superpolyamide nylon resin,
0.01% of a non-ionic surface active agent (100%),
17.15% of water,
76.35% of denatured ethyl alcohol,
5.44% of furfuryl alcohol.

3. A coating material for lithographic plates consisting essentially of the following constituents in substantially the following proportions, by volume:

0.11% of the water-soluble condensation product of p-diazo diphenylamine and formaldehyde,
0.94% of soluble superpolyamide nylon resin,
0.01% of polyethylene glycol tert.-dodecylthioether,
17.15% of water,
76.35% of denatured ethyl alcohol,
5.44% of furfuryl alcohol.

4. A coating material for lithographic plates consisting essentially of the following constituents in substantially the following proportions, by volume:

0.11% of the water-soluble condensation product of p-diazo diphenylamine and formaldehyde,
0.94% of soluble superpolyamide nylon resin,
0.01% of polyoxyethylene sorbitan mono-laurate,
17.15% of water,
76.35% of denatured ethyl alcohol,
5.44% of furfuryl alcohol.

5. A coating material for lithographic plates consisting essentially of the following constituents in substantially the following proportions, by volume:

0.11% of the water-soluble condensation product of p-diazo diphenylamine and formaldehyde,
0.94% of soluble superpolyamide nylon resin,
0.01% of polyoxyethylene sorbitan mono-palmitate,
17.15% of water,
76,35% of denatured ethyl alcohol,
5.44% of furfuryl alcohol.

6. A coating material for lithographic plates consisting essentially of the following constituents in substantially the following proportions, by volume:

0.11% of the water-soluble condensation product of p-diazo diphenylamine and formaldehyde,
0.94% of soluble superpolyamide nylon resin,
0.01% of an alkyl aryl polyether alcohol,
17.15% of water,
76.35% of denatured ethyl alcohol,
5.44% of furfuryl alcohol.

7. A pre-sensitized lithographic plate provided with a dried coating of the lithographic coating solution of claim 2.

No references cited.